Nov. 5, 1940.　　　R. M. SQUIRE　　　2,220,356
NUT LOCKING DEVICE
Filed March 19, 1938
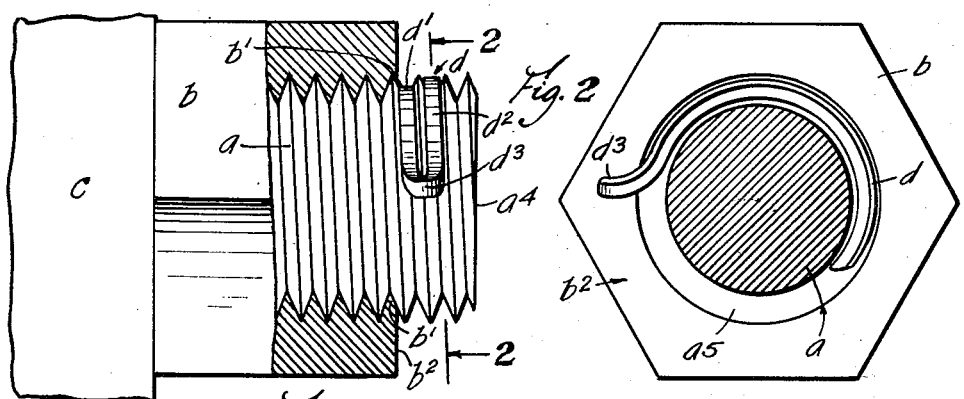
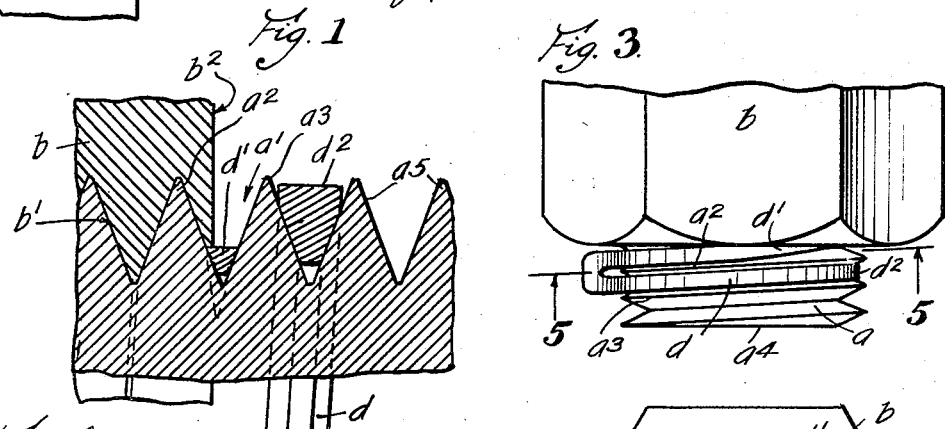
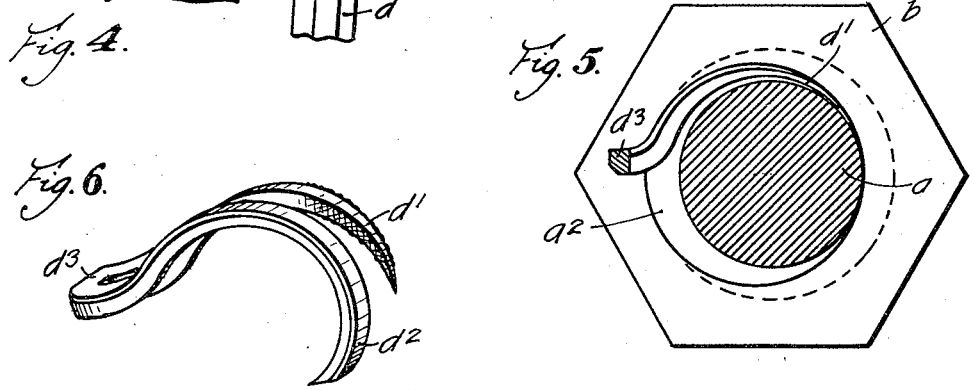
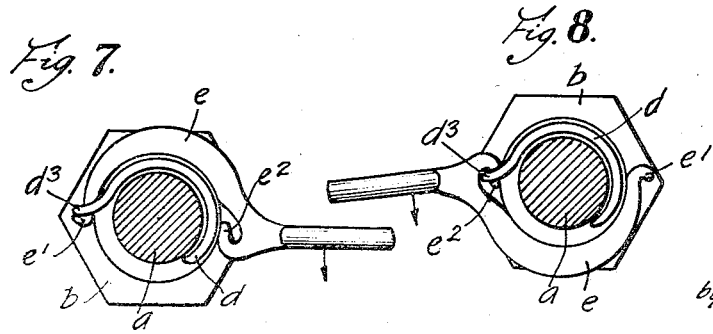
Inventor:
Ralph M. Squire
by ＭᵉRamsey.
Attorney.

Patented Nov. 5, 1940

2,220,356

UNITED STATES PATENT OFFICE 2,220,356

NUT LOCKING DEVICE

Ralph M. Squire, Bonneville, Oreg.

Application March 19, 1938, Serial No. 196,826

5 Claims. (Cl. 151—30)

The principal object of my invention is to provide a locking device for a nut and bolt element adapted for threaded engagement with each other. In its preferred form, my invention comprises a pointed wedge-shaped quill which may be seated in the trough of the threaded portion of a bolt to occupy the space therein which is only partially filled by the outer end of the threaded portion of said nut. A nut normally terminates in a plane face, and the threaded bore thereof terminates in a point or edge. Said point or edge does not completely fill the trough between the threads of the bolt upon which said nut is mounted. In one revolution or one turn of said thread inwardly from said plane face, the thread is whole or complete. Thus, a space is left in the trough of the engaging bolt thread which is only partially occupied. Said space, if straightened to lineal form, would represent a wedge-shaped aperture.

I propose to provide a locking device which is adapted to be seated in said unoccupied space with the pointed end thereof opposed to the direction of disengaging rotation of said parts. Said member, thus, wedges between said parts to prevent backing out or disengagement of said parts, one with the other. Because of the fact that said thread requires substantially one turn to cause it to develop from a point or edge to a full thread, said space is elongated with respect to its cross-section. Thus, an elongated wedge element of corresponding shape can be forced into said space, and be tightly secured therein solely by wedging action. A locking device embodying my invention thus might be termed an elongated, curved, pointed, wedge-shaped quill, which is adapted to be seated in and wedged securely in said space. I preferably make said quill with roughened under-faces and of a different degree of hardness from that of the nut and bolt elements so that it will tend to engage the bolt element rather than be rotated by the nut.

I preferably also provide a protuberance extending from the butt end of said quill; that is, the end opposed to the pointed end thereof; which protuberance aids in the insertion and preferably in the removal of said locking device. To aid in said removal, I preferably provide an aperture or a shouldered portion adapted for engagement by some retracting tool. Said protuberance also constitutes a shouldered engaging portion which enables said quill to be driven, forced or otherwise seated firmly in position so as to eliminate any initial play between the bolt and its nut element.

I further preferably provide some type of clasp tending to hold said quill in position. Said clasp may also extend laterally therefrom to prevent tipping or lateral shifting of said quill. Said quill preferably corresponds generally to the contour of the trough of the bolt thread and thus preferably is frustro-triangular in section. Said clasp can encircle, grip and produce a constricting effect about the bolt to hold it in position or it may be devoid of said gripping action.

The details of my invention and the mode of operation thereof are hereinafter described with reference to the accompanying drawing, in which:

Fig. 1 is an elevation of a nut and bolt structure having a locking device embodying my invention, shown secured thereto;

Fig. 2 is a transverse section taken on the line 2—2 in Fig. 1;

Fig. 3 is a fragmentary plan view thereof;

Fig. 4 is an enlarged fragmentary sectional view taken thru the nut, bolt and locking device, illustrating the manner in which the pointed end of said locking device underlies the partial thread extending into the trough between two bolt threads, to prevent further rotation of said nut upon said bolt;

Fig. 5 is a transverse sectional view taken on the line 5—5 in Fig. 3;

Fig. 6 is a perspective view of said locking device shown detached from said nut and bolt structure;

Fig. 7 is a more or less diagrammatic illustration, showing how a spanner type tool may be used to seat said locking device tightly in place;

Fig. 8 is a similar diagrammatic illustration, illustrating how said type of spanner device may be used to unseat said locking device.

The embodiment of my invention, illustrated in Figs. 1 to 8, inclusive, is adapted to be used in connection with a bolt $a$, having a nut $b$ in threaded engagement therewith, said nut abutting against a plate $c$ or other structure. A locking device $d$ is arranged partially to encircle said bolt and is provided with a wedge-shaped pointed quill member $d'$ adapted to underlie the partially formed nut thread $b'$ which terminates in the plane end $b2$ of said nut. As is illustrated in Fig. 4, said nut thread does not extend to the bottom of the trough $a'$ arranged between bolt threads $a2$ and $a3$. Said wedge-shaped pointed member thus can underlie said nut thread $b'$ and prevent said nut from rotating toward the free end a4 of the bolt.

Said locking device is bifurcated and said wedge-shaped pointed member d' is one of the bifurcations. Another bifurcation d2 extends substantially parallel to the pointed member d' and is joined thereto by an offset protuberance d3. Said protuberance extends out of the generally curved form of the locking member, as is illustrated in Fig. 5, and extends laterally therefrom. Said laterally projecting protuberance enables said locking member to be engaged by a tool e to keep said locking member tightly in position, as is illustrated in Fig. 7, or withdrawn by said tool, as is illustrated in Fig. 8. Said tool is provided with an outstanding lip e' which may be placed underneath said protuberance d3 and engage it, as is illustrated in Fig. 7, to rotate it clockwise and to force the wedge-shaped pointed member d' along the bolt trough a' until it wedges tightly under the partial nut thread b', to take up all of the slack. Said tool is provided with an opposed finger e2 for rotating said member counterclockwise, as viewed in Fig. 8, to retract said locking member from position when and if desired.

Said locking device is made bifurcated so that it will have lateral stability. That is, the clasp portion d2 is arranged to lie between bolt threads a3 and a5, while the pointed bifurcation lies between bolt threads a2 and a3. Said threads, of course, are continuations of each other, and are substantially identical in size and contour. Two bifurcations engaging in adjacent troughs prevent said locking device from tipping, and thus said pointed wedge-shaped member d' is held tightly in position.

The bifurcation d2 exercises a certain clamping action because said bifurcation is made of material having a degree of spring or elasticity to grip the bolt. The wedge-shaped pointed member d' is wedge-shaped longitudinally as well as in section. In section it is substantially triangular. The apex of the triangle is cut off slightly so as to be frustro-triangular so that said apex will not abut against the extreme bottom portion of the trough a' and hold the side portions thereof away from the sides of the adjacent threads a2—a3. It is to be noted that the sides of said pointed member d' diverge outwardly at the same angle as do the opposed faces of the threads a2—a3. This causes a tight engagement between said wedge-shaped member d' and the sides of the threads, and an exact seat in the trough a' thus formed between said threads.

The bifurcation d2 is provided with inclined sides, but the top portion is substantially rectangular. The side faces of both of said bifurcations preferably are roughened or scored as is diagrammatically illustrated in Fig. 6. This is particularly true upon the wedge-shaped pointed member d'. Said locking device also is preferably made of harder material than that of which the bolt and nut are constructed, and thus said scored or roughened faces of the locking device tend to seat into and key themselves with the faces of the bolt threads as said locking member is forced downwardly into the trough by the engagement pressure of the partial nut thread b' with the upper face of said pointed member d'. The upper face of said member d' is preferably smooth so as to minimize the engagement of said member with the point of the nut thread b'. This tends to cause said pointed member d' to lock itself with the bolt and to permit the nut to rotate to a wedged stalling point over the smooth top thereof. This tends to prevent said locking member from creeping about the bolt to permit slack between the nut and the bolt, which would destroy the function for which said locking device is devised.

Although I preferably make said locking device of harder material than of which the nut and bolt are constructed, it is to be understood that it could be softer, to produce the relatively wedging contact and keying of said locking device with the bolt thread. I consider it desirable, however, that said locking device, and the bolt and nut, respectively, be different in hardness, and prefer that the locking device be harder, so that the locking device seats into and is keyed into recesses formed in the sides of the bolt, rather than vice versa. The gripping action of the clasping bifurcation d2 also tends to prevent longitudinal or circumferential creeping of the locking device upon the bolt.

This embodiment of my invention is adapted to be slipped sidewise over a bolt when the nut is screwed tightly thereon and against the plate c or other structure which it is adapted to hold. The locking device can then be pushed so that the wedge-shaped pointed member d' lies underneath the partially formed nut thread b'. Additional force can be supplied by a spanner type wrench or tool, as is illustrated in Fig. 7, with the protuberance engaged by the lip e'. Substantial force can be applied to said locking device to force the wedge-shaped pointed member d' tightly under the nut thread and along said trough until the parts are tightly bound together. Said relative rotation causes the scored or roughened sides of said wedge-shaped pointed member to seat in the side walls of the bolt thread, and said seating is sufficiently secure to prevent said nut from loosening, even in the presence of such external displacing factors as vibration, pressure, loosening forces and human carelessness. Said devices can thus be easily applied and removed, and when removed are reusable. Said locking device is simple in design and is inexpensive. The locking action is produced by the inclined planes of the wedge-shaped pointed members which tend to block the underface of the external portion of the nut thread to hold it securely in place.

I have observed that the ordinary nut is provided with an end thread crest which, if examined carefully, is saw-toothed. Thus, if said locking device is provided with a flat hardened top, it tends to mash down said serrations without permitting them to take hold of the locking device to disengage it. The roughened or scored side faces of said locking device thus provide a base portion having physical engagement with the bolt.

The screw threads of a nut and bolt wind around and around the bolt axis in a spiral pattern or direction. Normally the threaded end of the bolt and both ends of the nut are cut off squarely across, or perpendicularly to that axis. In this square cut-off, the spiral individual thread is cut in a very long, straight, vertical, diagonal slice, from side to side, a full circumference in length.

Looking at the side of a nut threaded on a bolt, held in a horizontal position, only half of the end thread of the nut in its contact with the bolt thread is visible at any one time. This sliced end thread of the nut is all-important to this device and its explanation, and it has been found that it can be better observed for study as a whole, and still correctly in principle, if for purposes of diagrammatic illustration the whole end turn of the nut thread is considered as straightened out, e. g., as a sewing thread drawn tightly from a spool; being kept and shown upon the bolt thread in true working relation to it as the track upon which the nut thread slides in rotating.

As the study-analysis proceeds, many geometrical relations of various parts are recognized, tying in the functions of parts.

The essential consideration is that while the bolt's V-thread trough continues, vacant, beyond the nut in a spiral, the fragmentary end thread of the nut follows the line of its square end cut-off—which is thus at a diverging angle from the spiral bolt thread, producing at the end of the nut a long vacant space between nut thread and adjoining diverging bolt thread trough, a space which is a full thread turn in length, and a full thread width across at finish.

It is, of course, apparent that if the space in the trough $a'$ of the nut were completely filled underneath the nut thread $b'$, and the filling material were securely fastened to the bolt, that said bolt would be prevented from backing out, even to the slightest degree. I utilize this factor in locking said nut, and it is the utilization of said space that gives mechanical basis for the wedging between the nut and bolt by my locking device.

In each of the modifications of my invention, the wedge-shaped member should be tapered as defined in the claims. In length, a locking device embodying my invention may vary from a wedge point which constitutes a mere quill and has the least bearing surface able to support the nut pressure, to a coil completely encircling the bolt upon which it is mounted and to which it is firmly secured. I preferably arrange said locking member to have some type of clasping device, and this preferably extends about the bolt sufficiently so that the locking device is held to said bolt independently of the wedging action of the pointed member beneath the nut.

The wedge-shaped pointed member preferably extends about the bolt a distance equal to the length of the partial end thread of a nut, so as to underlie a nut to this extent. The locking device, and particularly the wedge-shaped pointed member thereof, should be capable of ready and certain removal. To this end, the roughening of its inclined base and sides should not be more toothed, scored or roughened than is necessary to secure seating of said member between the bolt threads. Cementing by rust and corrosion could be avoided largely by providing a protective grease or other type of coating when said locking device is originally secured. Non-corrosive metals, or metals having non-corrosive surfaces, could also be used for an exposed surface condition so as to eliminate corrosion. Although I preferably make my various types of locking devices of metal, and particularly of those metals having greater hardness than the bolt and nut structures (and in those having clamps, I preferably make said locking devices of elastic material), I do not wish to limit my invention by said statements of performance, and intend also to use ceramic or acid or heat destructible materials where they are deemed desirable or proper.

Although I have illustrated my invention as being adapted for seating and unseating by rotative-type tools, such as wrenches, chucks and threaded lock nuts, it is to be understood that said devices may also be applied and removed by ordinary pliers, screw-drivers and hammers, or similar common tools.

I claim:

1. In a nut locking device for a nut and bolt assembly provided with an elongated wedge-shaped member triangular in section adapted to be inserted between the root of a bolt thread and the spiral crest of that portion of a mutually engaging fragmentary nut thread adjoining the face of the nut, the face of said member underlying said crest being tapered to substantial parallelism therewith when the other two faces are wedged between the sides of said bolt thread.

2. In a nut locking device for a nut and bolt assembly provided with an elongated wedge-shaped member triangular in section adapted to be inserted between the root of a bolt thread and the spiral crest of that portion of a mutually engaging fragmentary nut thread adjoining the face of the nut, said member being substantially complementary to said fragmentary nut thread to fill a bolt thread groove with which said nut thread engages for substantially the full length of said fragmentary nut thread.

3. In a nut locking device for a nut and bolt assembly provided with an elongated wedge-shaped member triangular in section adapted to be inserted between the root of a bolt thread and the spiral crest of that portion of a mutually engaging fragmentary nut thread adjoining the face of the nut, one face of said triangular member being curved to correspond to the general sweep of said non-circular fragmentary nut thread crest, and the angular juncture spaced from said face being curved to follow the general sweep of the root of the bolt thread.

4. In a nut locking device for a nut and bolt assembly provided with an elongated wedge-shaped member triangular in section adapted to be inserted between the root of a bolt thread and the spiral crest of that portion of a mutually engaging fragmentary nut thread adjoining the face of the nut, the face of said member underlying said crest being tapered to substantial parallelism therewith when the other two faces are wedged between the sides of said bolt thread, said first-mentioned face of said member being harder than said crest of said nut thread.

5. In a nut locking device for a nut and bolt assembly provided with an elongated wedge-shaped member triangular in section adapted to be inserted between the root of a bolt thread and the spiral crest of that portion of a mutually engaging fragmentary nut thread adjoining the face of the nut, the face of said member underlying said crest being tapered to substantial parallelism therewith when the other two faces are wedged between the sides of said bolt thread, said member being harder than said nut thread and bolt thread, said latter two faces being roughened to engage said bolt thread sides against which they bear, and a clasp adapted for engaging said member to a bolt, said clasp being laterally offset from and extending backwardly upon said member.

RALPH M. SQUIRE.